(12) United States Patent
Chaudeurge

(10) Patent No.: US 12,479,493 B2
(45) Date of Patent: Nov. 25, 2025

(54) SLIDING ACCESSORY FOR A STROLLER, AND TRANSPORT ASSEMBLY COMPRISING A STROLLER AND AT LEAST ONE SUCH SLIDING ACCESSORY

(71) Applicant: BABYZEN, Aix-en-Provence (FR)

(72) Inventor: Jean-Michel Chaudeurge, Tourves (FR)

(73) Assignee: BABYZEN, Aix-en-Provence (FR)

( * ) Notice: Subject to any disclaimer, the term of this patent is extended or adjusted under 35 U.S.C. 154(b) by 294 days.

(21) Appl. No.: 18/264,692

(22) PCT Filed: Feb. 15, 2022

(86) PCT No.: PCT/EP2022/053595
§ 371 (c)(1),
(2) Date: Aug. 8, 2023

(87) PCT Pub. No.: WO2022/175231
PCT Pub. Date: Aug. 25, 2022

(65) Prior Publication Data
US 2024/0109578 A1    Apr. 4, 2024

(30) Foreign Application Priority Data
Feb. 16, 2021   (FR) .................................... 2101485

(51) Int. Cl.
*B62B 19/02*        (2006.01)
*B62B 9/00*         (2006.01)

(52) U.S. Cl.
CPC ............... *B62B 19/02* (2013.01); *B62B 9/00* (2013.01)

(58) Field of Classification Search
CPC .................................. B62B 19/02; B62B 9/00
See application file for complete search history.

(56) References Cited

U.S. PATENT DOCUMENTS 2,352,966 A * 7/1944 Morando ................ B62B 19/02
                                                    280/8
3,774,926 A * 11/1973 Chase ..................... B62B 19/02
                                                    D12/604

(Continued)

FOREIGN PATENT DOCUMENTS

| GB | 2195106 A     | 3/1988  |
| JP | H0681867 U    | 11/1994 |
| JP | 2020026260 A  | 2/2020  |

OTHER PUBLICATIONS

International Search Report for PCT/EP2022/053595 mailed Jun. 1, 2022, 2 pages.

(Continued)

*Primary Examiner* — Brian L Swenson
(74) *Attorney, Agent, or Firm* — NIXON & VANDERHYE

(57) ABSTRACT

This sliding accessory includes an elongated baseplate for sliding on snow, presenting opposite sides and a shoe, removably attached to a stroller wheel. The shoe defines a housing receiving a lower wheel portion, open toward the top and fixedly delimited by a bottom wall, and by two parallel side walls facing one another. Each side wall has a relief projecting toward the other. The reliefs cooperate by contact with the tire so as, by relative displacement between the accessory and the wheel, to pass the accessory between an operational configuration wherein the reliefs press the tire against the bottom wall to wedge part of the tire in the lower part of the housing to secure the sliding accessory to the wheel, and an inoperative configuration wherein the accessory disengages from the wheel, the tire being elastically compressed by the reliefs as the accessory passes between the two configurations.

15 Claims, 11 Drawing Sheets

(56) References Cited

U.S. PATENT DOCUMENTS

| | | | | |
|---|---|---|---|---|
| 5,407,217 | A * | 4/1995 | Lambert | B62B 19/02 |
| | | | | 280/47.38 |
| 5,413,361 | A * | 5/1995 | Mosher | B62B 19/02 |
| | | | | 280/8 |
| 9,950,732 | B1 * | 4/2018 | Patterson | B62B 19/02 |
| 10,343,705 | B1 * | 7/2019 | Farrar | B62B 9/142 |
| 2010/0289231 | A1 * | 11/2010 | Huot | B62B 19/02 |
| | | | | 280/13 |
| 2015/0291202 | A1 * | 10/2015 | Love | B62B 19/02 |
| | | | | 280/845 |
| 2021/0129887 | A1 * | 5/2021 | Walker | B62B 9/142 |
| 2023/0373550 | A1 * | 11/2023 | McHugh | B62B 9/00 |

OTHER PUBLICATIONS

Written Opinion of the ISA for PCT/EP2022/053595 mailed Jun. 1, 2022, 6 pages.
FR Search Report for FR 2101485 mailed Oct. 6, 2021, 2 pages.

* cited by examiner

SLIDING ACCESSORY FOR A STROLLER, AND TRANSPORT ASSEMBLY COMPRISING A STROLLER AND AT LEAST ONE SUCH SLIDING ACCESSORY

CROSS-REFERENCE TO RELATED APPLICATIONS

This application is the US national stage of PCT/EP2022/053595, filed Feb. 15, 2022 and designating the United States, which claims the priority of FR 2101485, filed Feb. 16, 2021. The entire contents of each foregoing application are incorporated herein by reference.

BACKGROUND OF THE INVENTION

Field of the Invention

The present invention relates to a sliding accessory for a stroller. It also relates to a transport assembly comprising a stroller and at least one such sliding accessory.

Description of the Related Art

The invention concerns the problem of transporting a child in a stroller on snow-covered ground. Indeed, for several weeks during the winter, stroller users living in certain latitudes, as well as winter sports enthusiasts, have to deal with this problem, in the sense that it is very difficult and can be dangerous to push a stroller on snow-covered ground, because the wheels of the stroller, particularly the front wheels, sink into the snow. Furthermore, stroller users face the additional difficulty that snow-covered ground often alternates with hard, in other words, snow-free, "rolling" ground, for example sheltered ground under a covered structure or inside an enclosed structure, such as a shopping mall.

The invention is therefore more specifically relates to stroller accessories provided to slide on snow or, more generally, on ground with characteristics similar to those of snow-covered ground. Two solutions, not entirely satisfactory, are currently available on the market.

The first is a multi-purpose accessory, in the sense that it is designed for use on a variety of existing stroller models. This accessory includes an elongated baseplate, forming a ski runner, on the upper face of which is provided a shoe designed to be removably attached to a stroller wheel. This shoe includes, for example, jaws, straps, hooks, hoops, etc., in other words, more generally, movable mechanical elements which must be manipulated by the user, often with the aid of tools, so as to harness securely to the stroller wheel. JP 2020 026260 provides an example. In practice, the handling of these movable mechanical elements is time-consuming and tedious, having to be repeated at least for each front wheel of the stroller and often being very uncomfortable for the user, all the more so as this installation generally has to be carried out outdoors and in cold weather. Of course, when it comes to removing the sliding accessory(ies) from each of the previously harnessed wheels, the user is faced with the same complexity when it comes to removing all the mechanical paraphernalia of the sliding accessories, which then prove cumbersome to store and cart away so that the stroller can continue to travel on hard ground.

A second, more radical solution is to use a stroller the front wheel or wheels of which are designed to be completely disengaged from the rest of the stroller and replaced by as many sliding devices, each comprising a ski topped by a directional pivoting means. These sliding devices are expensive and, when not in use, are heavy and cumbersome to store and transport with the stroller still fitted with its front wheel(s). In addition, when the sliding device(s) is (are) to be installed on the stroller to replace the front wheel(s), handling is particularly tedious, since the user is obliged to hold the front of the stroller high up from the ground for the duration of the replacement operation, even though the stroller is generally loaded with a child.

GB 2 195 106 proposes an alternative approach, disclosing a sliding accessory for a stroller. This sliding accessory is designed to be mounted on both the front wheel and the rear wheel located on the same lateral side of a stroller. The sliding accessory includes a trough-shaped main body, which at the front is shaped into a hook and at the rear is fitted with a clamp whose jaws form a circular-section cavity between them. In order to hold the sliding accessory to the front and rear wheels, the front wheel is first housed inside the aforementioned hook, then the edge of the rear wheel is forced between the jaws of the clamp until it is received in the aforementioned cavity. The jaws then trap the rear wheel edge inside the cavity, allowing transverse movement between them, both vertically and horizontally.

As for JP H06 81867 U, it proposes a more rudimentary sliding accessory for a shopping basket, designed to grip the sides of a wheel along only two horizontal contact lines. Wheel retention is sketchy, making the viability of using this accessory on a stroller questionable.

SUMMARY OF THE INVENTION

The aim of the present invention is to propose a new sliding accessory for strollers which, in use, is simple, effective and practical.

To this end, the invention has as its object a sliding accessory for a stroller, comprising:
  a baseplate, having an elongated shape along a first axis and presenting first and second sides which are opposite each other according to a second axis perpendicular to the first axis, the baseplate being provided, on the first side of the baseplate, with a snow sliding face which is intended to be applied against a snow-covered ground, and
  a shoe, which is carried by the baseplate, being arranged on the second side of the baseplate, and which is able to be removably attached to a wheel of the stroller,
wherein the shoe defines a housing for receiving a lower portion of the wheel, which housing is open, according to the second axis, in the opposite direction to the first side of the baseplate and which housing is fixedly delimited by a bottom wall, which is arranged transversely to the second axis and by two side walls which are arranged substantially parallel to the first axis and to the second axis, being arranged facing each other according to a third axis which is perpendicular to the first and second axes,
wherein each of the two side walls is provided with a relief which projects from the remainder of the corresponding side wall toward the other side wall according to the third axis, and
wherein said reliefs are jointly arranged to cooperate by contact with a tire of the wheel so as, by relative displacement between the sliding accessory and the wheel according to the second axis, to pass the sliding accessory reversibly between:
  an operational configuration, in which the reliefs press the tire against the bottom wall according to the second axis so as to wedge a lower portion of the tire in the lower part of the housing to attach the sliding accessory to the wheel, and an inoperative configuration, in which the sliding accessory is detached from the wheel, the tire being elastically compressed by the reliefs according to the third axis during the transition of the sliding accessory between the operational and inoperative configurations.

One of the ideas behind the invention is to be able to reversibly attach and detach the sliding accessory conforming to the invention to a stroller wheel instantaneously, in particular without using tools or adding or requiring moving mechanical parts, while guaranteeing the reliability and safety of the attachment of the sliding accessory to the wheel. To achieve this, the invention takes advantage of the elastic compression capacity of the tire on the wheel, otherwise known as the tread, which can be either solid, in particular foamed, or provided with a pressurized inner tube. In all cases, the tire forms an outer cover of the wheel and is supported by a rim of the latter, forming two annular beads that project slightly beyond the rim on the respective lateral sides of the wheel. According to the invention, the sliding accessory fixedly delimits a housing which, assuming that the baseplate of the sliding accessory is placed on a horizontal ground, is open upwards so as to be able to engage/disengage the wheel following vertical movements. This housing is closed toward the bottom by a base wall and laterally by two side walls facing each other, respectively left and right, considering the anteroposterior longitudinal direction of the baseplate. On its side turned toward the other wall, each wall incorporates a projecting relief which is designed, notably by its shape and dimensions, to interfere by contact with the tire of the wheel, in particular the beads of the latter, when the wheel is engaged/disengaged vertically with respect to the housing. Thus, more precisely, when the user wishes to secure the sliding accessory to the wheel, this wheel is engaged vertically downward toward the base of the housing, in particular after having slightly lifted the part of the stroller where the wheel is and placing the sliding accessory on the ground vertically below it, so that, successively, the tire, in particular the beads of the latter, is brought into contact with the reliefs, then elastically compressed to push these reliefs downward, then is at least partially decompressed once the reliefs have been passed, the wheel then being held downward against the base of the housing by the reliefs. The sliding accessory is then in its operational configuration, being attached to the wheel and ready to ensure that the latter, and hence the stroller, slides efficiently and safely over snow-covered ground, including when cornering, as long as the or each of the front wheels of the stroller, thus equipped with the sliding accessory, can be pivoted relative to the stroller chassis. When the user then wishes to disengage the sliding accessory from the wheel to switch the latter to the inoperative configuration, the user releases the wheel vertically upwards from the housing, in particular by keeping the accessory pressed against the ground with his feet placed on the baseplate, while at the same time slightly lifting the wheel area of the stroller, so that the tire, and in particular the tire beads, are successively elastically compressed by the reliefs in order to pass over them in an upward direction, then released once the reliefs have been passed over. The stroller wheel is then released from the sliding accessory and ready to roll on hard, snow-free ground. In practice, the above-mentioned reliefs can present various forms and can advantageously incorporate optional features that improve or facilitate their effects, as detailed below. In any case, manipulating the sliding accessory and the stroller to switch the sliding accessory between its inoperative and operational configurations is particularly easy, convenient and instantaneous, taking only a few seconds, using no tools and requiring no mechanical parts that would be movable within the sliding accessory. Furthermore, the sliding accessory in accordance with the invention in no way alters the effectiveness of the suspension system of the stroller, since it does not constrain wheelbase variation. Further advantages and advantageous optional features of the sliding accessory, particularly in relation to its strength, manufacture and safety, will become apparent in the remainder of this document.

According to additional advantageous features of the sliding accessory in accordance with the invention:

The relief of each side wall is beveled so as to progressively compress the tire of the wheel toward the other side wall when the sliding accessory transitions from one of the operational and inoperative configurations to the other configuration.

Each relief presents, in cross-section to the third axis, a "V"-shaped profile or a truncated "V"-shaped profile at the tip of the "V".

Each relief presents, in projection according to the third axis on the corresponding side wall, an arched shape which is domed toward the bottom wall.

Each relief presents, on its side turned toward the bottom wall, a profile which matches the curvature of the tire when the sliding accessory is in the operational configuration.

Each relief is constituted of a plurality of elements which are separated from one another along the first axis.

The housing is also fixedly delimited by a front wall and a rear wall, which are arranged facing one another according to the first axis and which connect each of the two side walls to one another, and the front and rear walls are able, when the sliding accessory is in the operational configuration, to form respective abutments, according to the first axis, for the lower portion of the wheel by cooperating by contact with the tire of the lower portion of the wheel.

The baseplate and the shoe are integrally formed with one another, in particular by molding.

The baseplate is provided with through openings, which connect the first and second sides of the baseplate to one another and which are arranged inline, along the second axis, on the reliefs for the purpose of demolding the sliding accessory.

The bottom wall is formed by a portion of tube, which is centered on a geometric axis parallel to the third axis and the concave surface of which is directed away from the first side of the baseplate.

The bottom wall is substantially flat, being formed by the baseplate.

The invention also has as its object a transport assembly, comprising:

a stroller comprising at least one front wheel and two rear wheels, each front wheel having a tire which is elastically deformable by compression, and for each front wheel, a sliding accessory, which is as defined above and which, in the operational configuration, is attached to the corresponding front wheel.

According to additional advantageous features of the transport assembly in accordance with the invention:

The tire of each front wheel is supported by a rim of the front wheel and protrudes from this rim on each of lateral sides of the front wheel, thus forming two beads, the width of the tire of each front wheel at the level of the beads while the tire is at rest is both less than or equal to a spacing, according to the third axis, between the side walls outside the reliefs and greater than a spacing, according to the third axis, between the reliefs, and the spacing, along the third axis, between the reliefs is equal to or greater than the width of the of each front wheel.

Each front wheel is mounted on a front part of a frame of the stroller, being connected to this front part of the frame so as to be freely pivotable about a pivot axis which extends radially or orthoradially to the axis of rotation of the front wheel, and, when the or each front wheel and the associated sliding accessory in the operational configuration are attached to each other, the stroller remains maneuverable in turns by pivoting the front wheel or wheels relative to the chassis.

The housing is also fixedly delimited by a front wall and a rear wall, which are arranged facing one another according to the first axis and which connect each of the two side walls to one another, the front and rear walls are able, when the sliding accessory is in the operational configuration, to form respective abutments, according to the first axis, for the lower portion of the wheel by cooperating by contact with the tire of the lower portion of the wheel, and the front and rear walls are, at a mouth of the housing, distant from one another along the first axis with a spacing less than the outer diameter of the tire.

BRIEF DESCRIPTION OF THE DRAWINGS

The invention will be better understood on reading the following description, given by way of example only and made with reference to the drawings in which.

DETAILED DESCRIPTION

Figure 1:
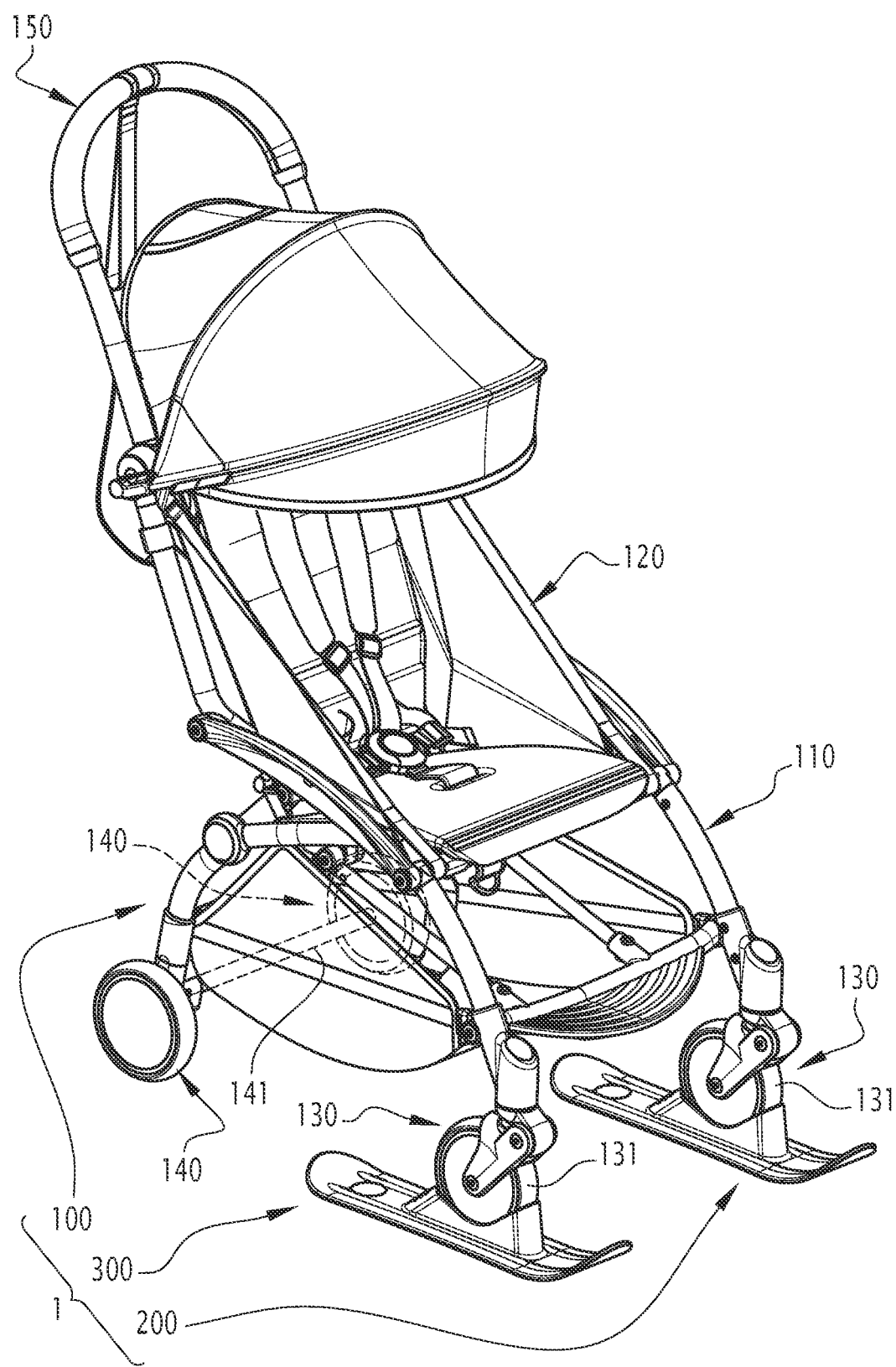
FIG. 1 is a perspective view of a transport assembly in accordance with the invention.
Figure 5:
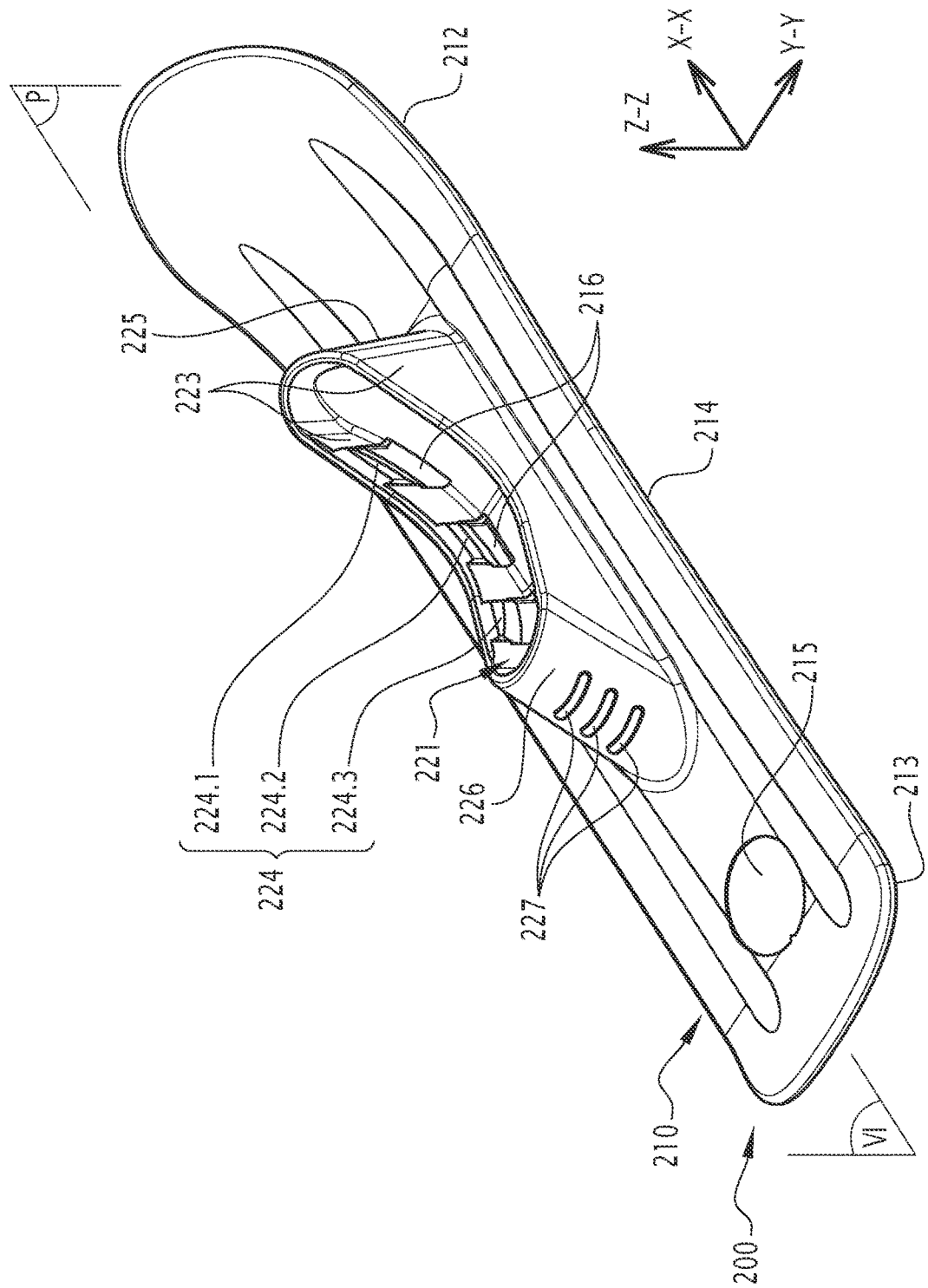
FIG. 5 is a perspective view of one of the sliding accessories in FIG. 2, shown alone.
Figure 6:
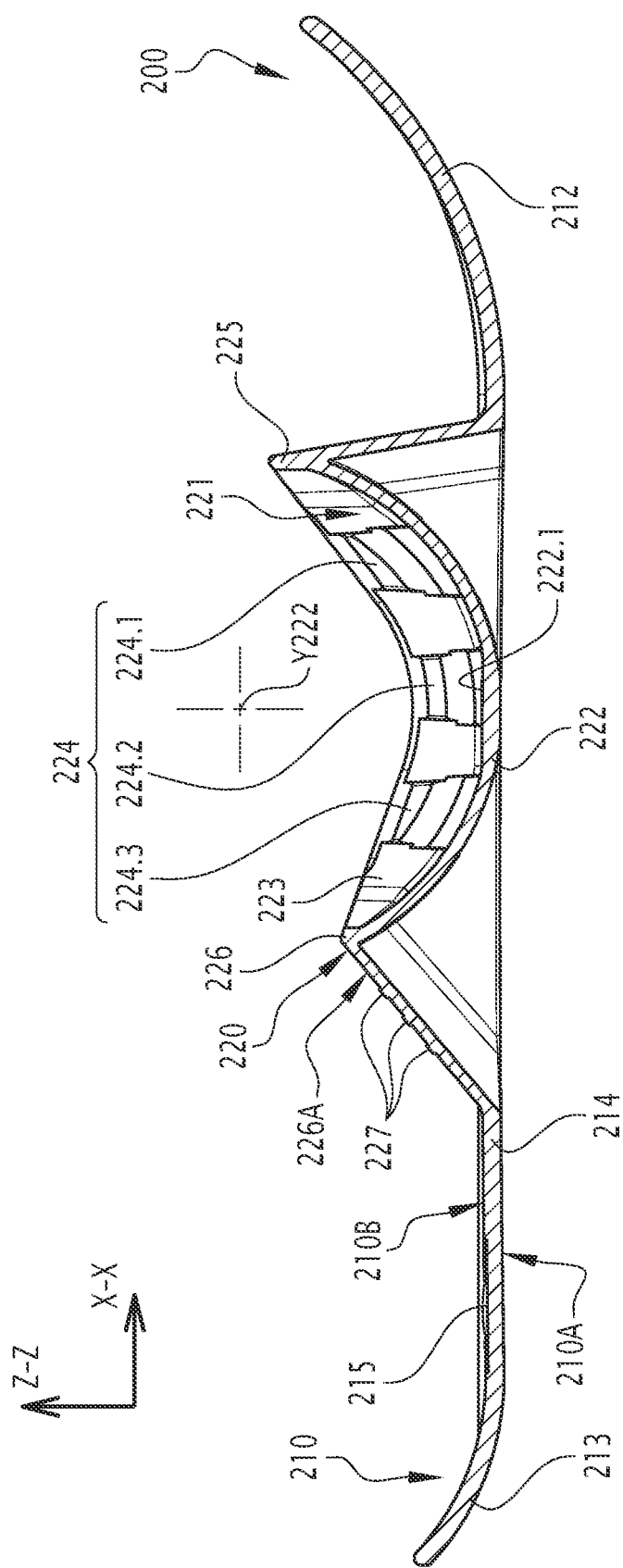
FIG. 6 is a cross-section according to the plane VI of FIG. 5.
Figure 7:
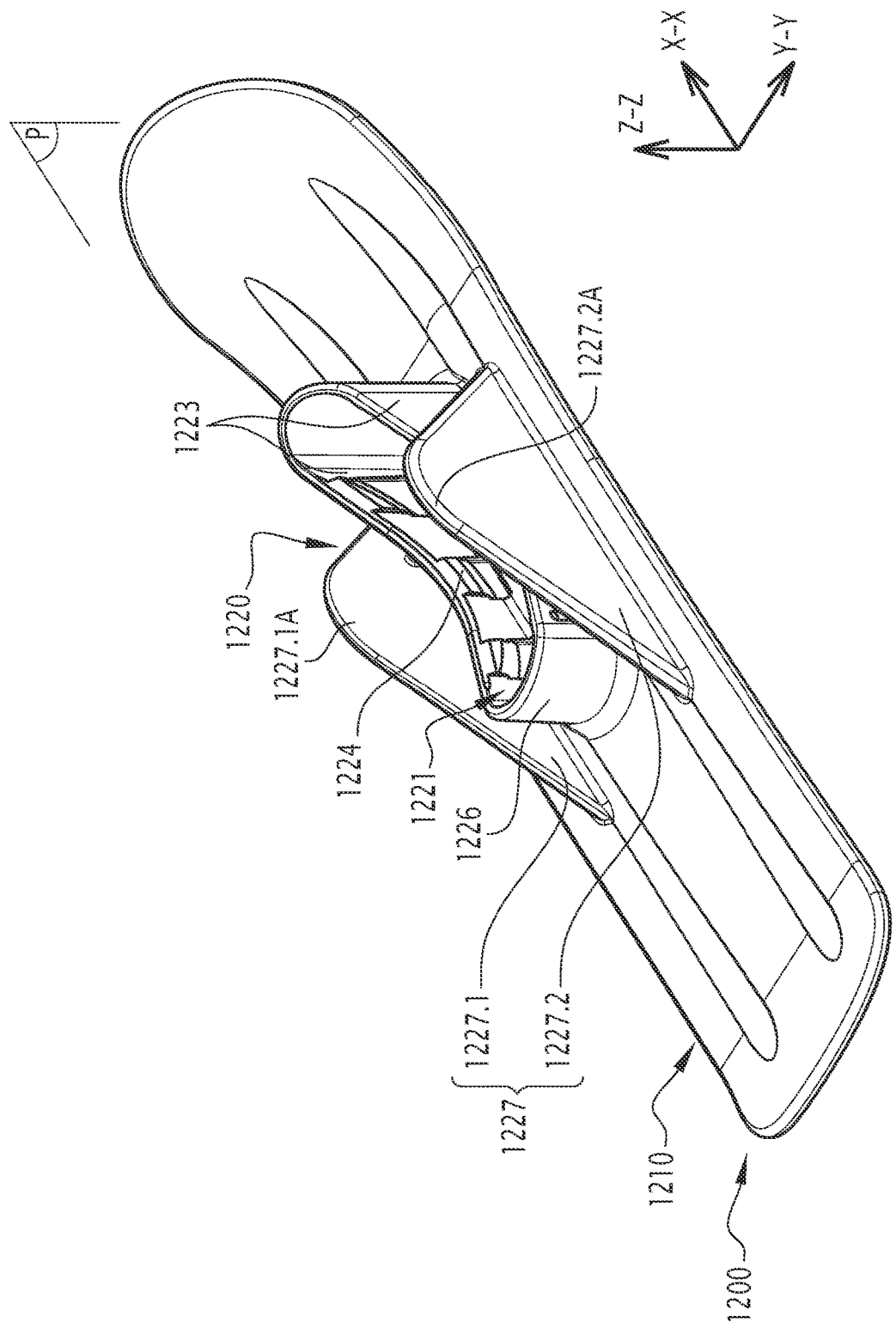
FIGS. 7 to 10 are views similar to FIGS. 5, 6, 3 and 4 respectively, illustrating a further embodiment of a sliding accessory in accordance with the invention.
Figure 8:
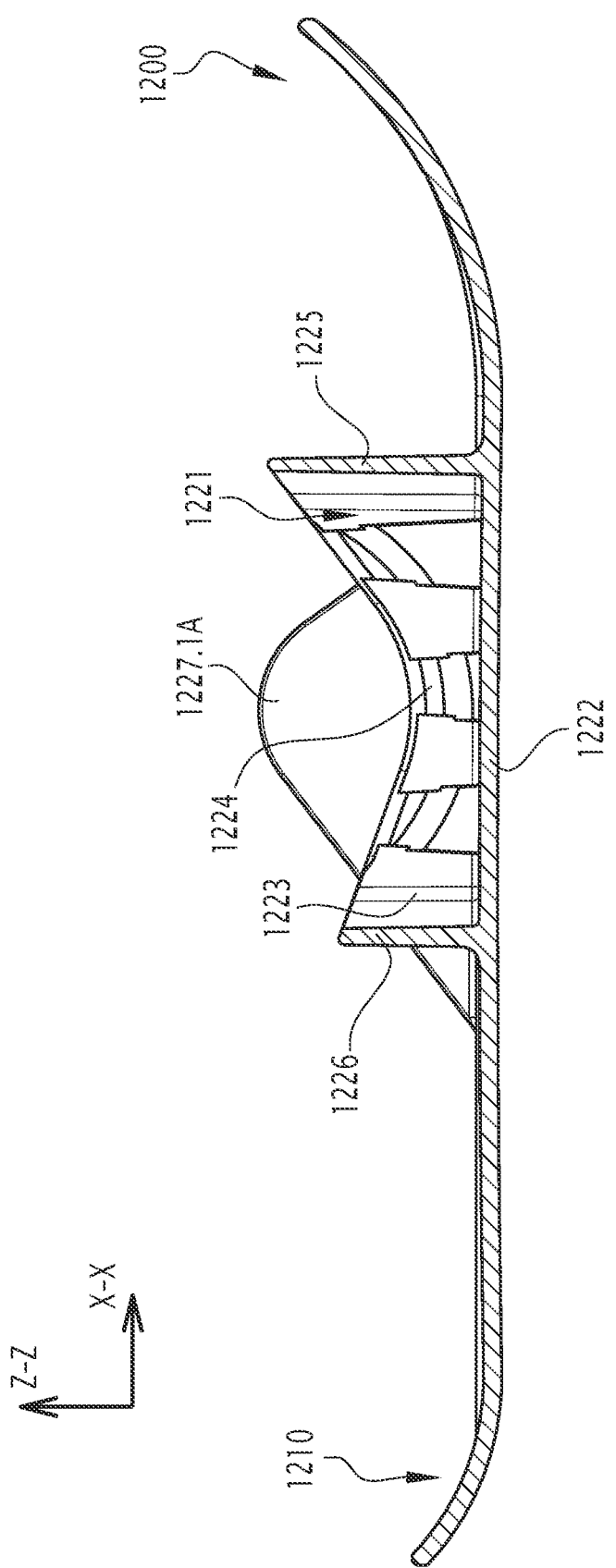
Figure 9:
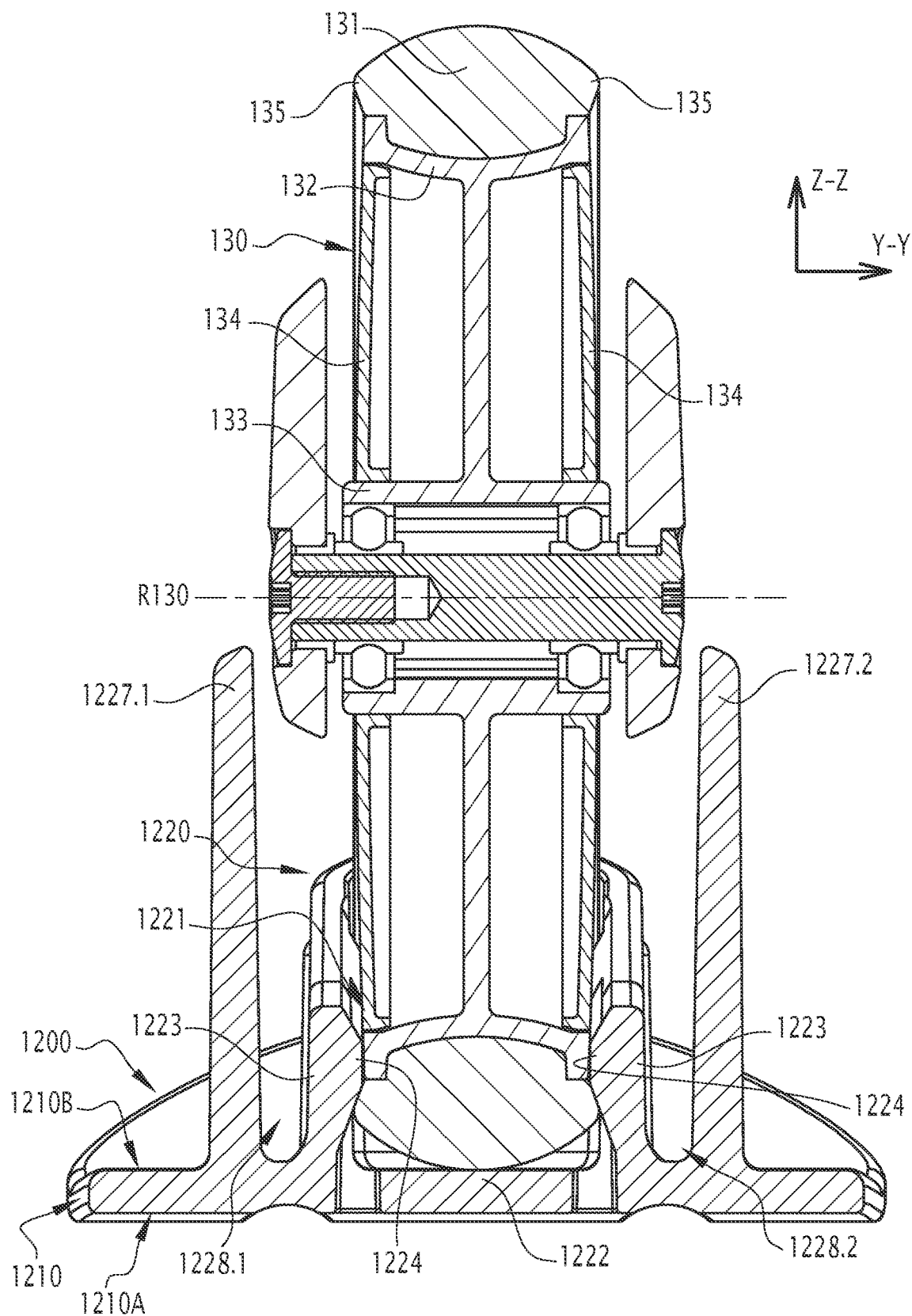
Figure 10:
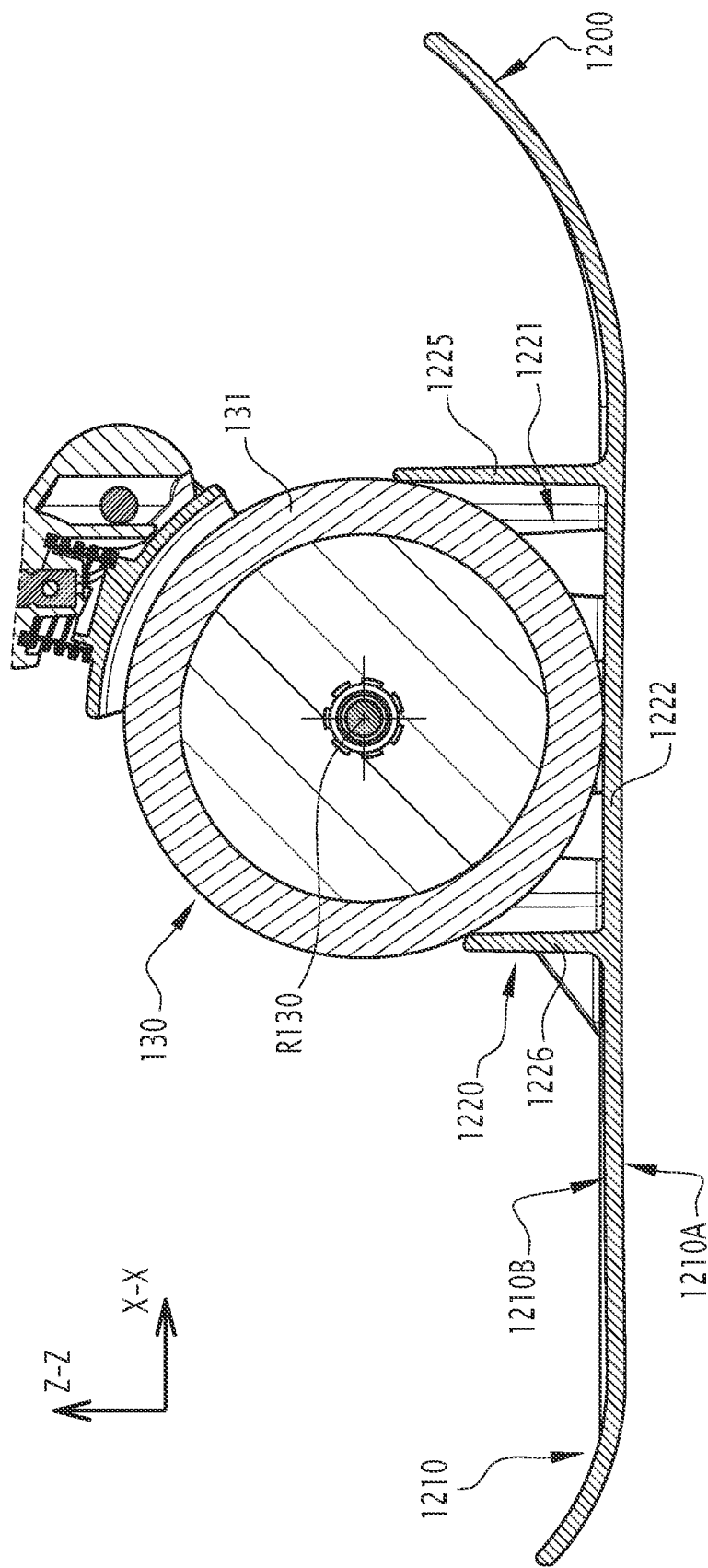
Figure 11:
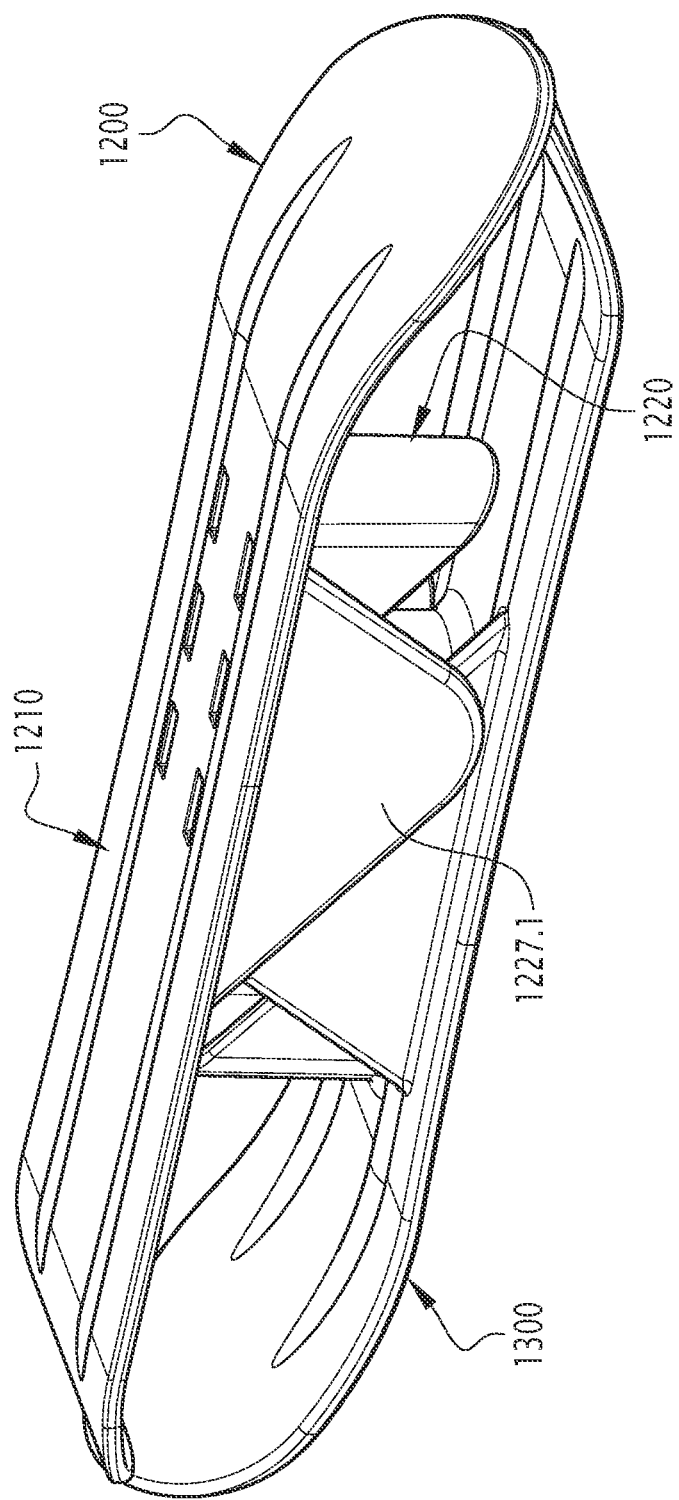
FIG. 11 is a perspective view of the sliding accessories of the embodiment shown in FIGS. 7 to 10, arranged head to tail relative to each other.

FIGS. 1 to 4 show a transport assembly 1 including a stroller 100 as well as two sliding accessories 200 and 300 which, as will be explained in greater detail below, enable a child in the stroller 100 to be transported on snow-covered ground by sliding at least the front of the stroller 100 on the snow. In FIG. 1, the sliding accessories 200 and 300 are attached to the stroller 100, while in FIG. 2, only the sliding accessory 200 is attached to the stroller, while the sliding accessory 300 is detached from the stroller. In FIGS. 5 and 6, the sliding accessory 200 is shown alone.

Before describing the sliding accessories 200 and 300 in detail, and the way they can be connected to and disconnected from the stroller 100, the stroller 100 will be described in greater detail, it being noted that this stroller 100 can typically fall within the scope of what is known.

The stroller 100 comprises a frame 110. This frame 110 defines an antero-posterior direction, in the sense that two parts of the frame 110, which are opposite each other along this antero-posterior direction, correspond respectively to a front part of the frame, which faces forwards when the stroller 100 is pushed forwards, and a rear part of the frame, which faces backwards when the stroller 100 is pushed forwards. In the example shown in the figures, the frame 110 presents a tubular structure, produced mainly by assembling tubes.

Whatever its form, the frame 110 is designed to support, in use, a receiving member 120 allowing to receive a child to be transported by the stroller 100, the child being installed in this receiving member 120 in a seated position, in a lying position or in an intermediate position between these latter. Thus, the receiving member 120 is chosen from a seat, a carrycot, a bassinet, etc., the form in which the receiving member 120 is made being non-limiting to the invention. Furthermore, in a manner known per se and not described in detail, the chassis 110 is advantageously designed to enable the receiving member 120 to be interchanged, in particular, according to the age of the child to be transported.

Figure 2:
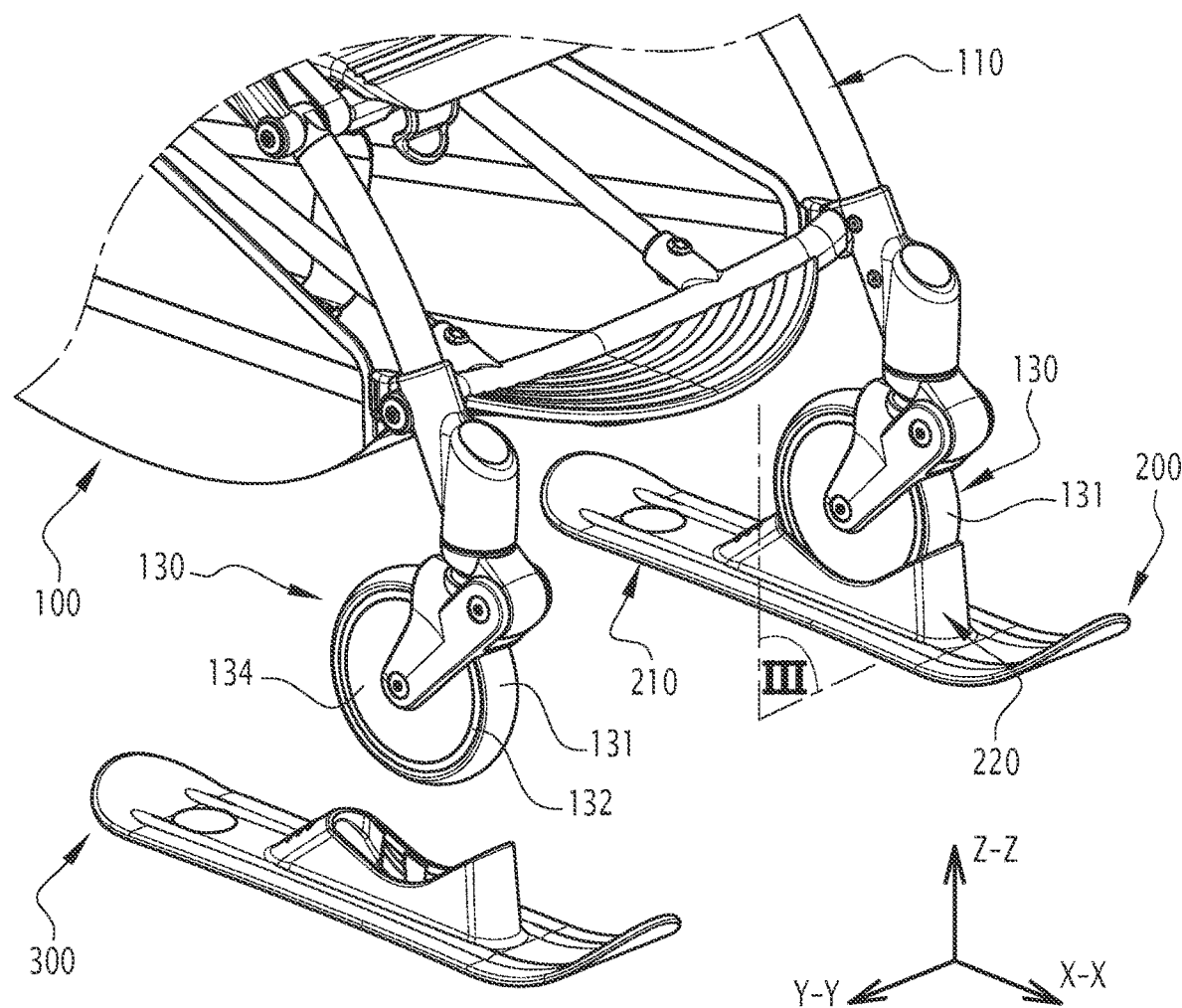
FIG. 2 is a perspective view of a front part of a stroller and of two sliding accessories, which belong to the transport assembly of FIG. 1, one of these sliding accessories being shown in an operational configuration while the other sliding accessory is shown in an inoperative configuration.

The stroller 100 also includes wheels which, when in use, rest and roll on the ground when the latter is sufficiently hard. These wheels are arranged in the lower region of the chassis 110 in order to support the latter with respect to the ground. As shown in FIGS. 1 and 2, these wheels include one or more front wheels 130 and rear wheels 140. In the example shown in the figures, two front wheels 130 are provided, that is, a left front wheel and a right front wheel, which are located respectively on the left and right sides of the frame 110, and two rear wheels 140 are provided, that is, a left rear wheel and a right rear wheel, which are located respectively on the left and right sides of the frame 110.

Figure 3:
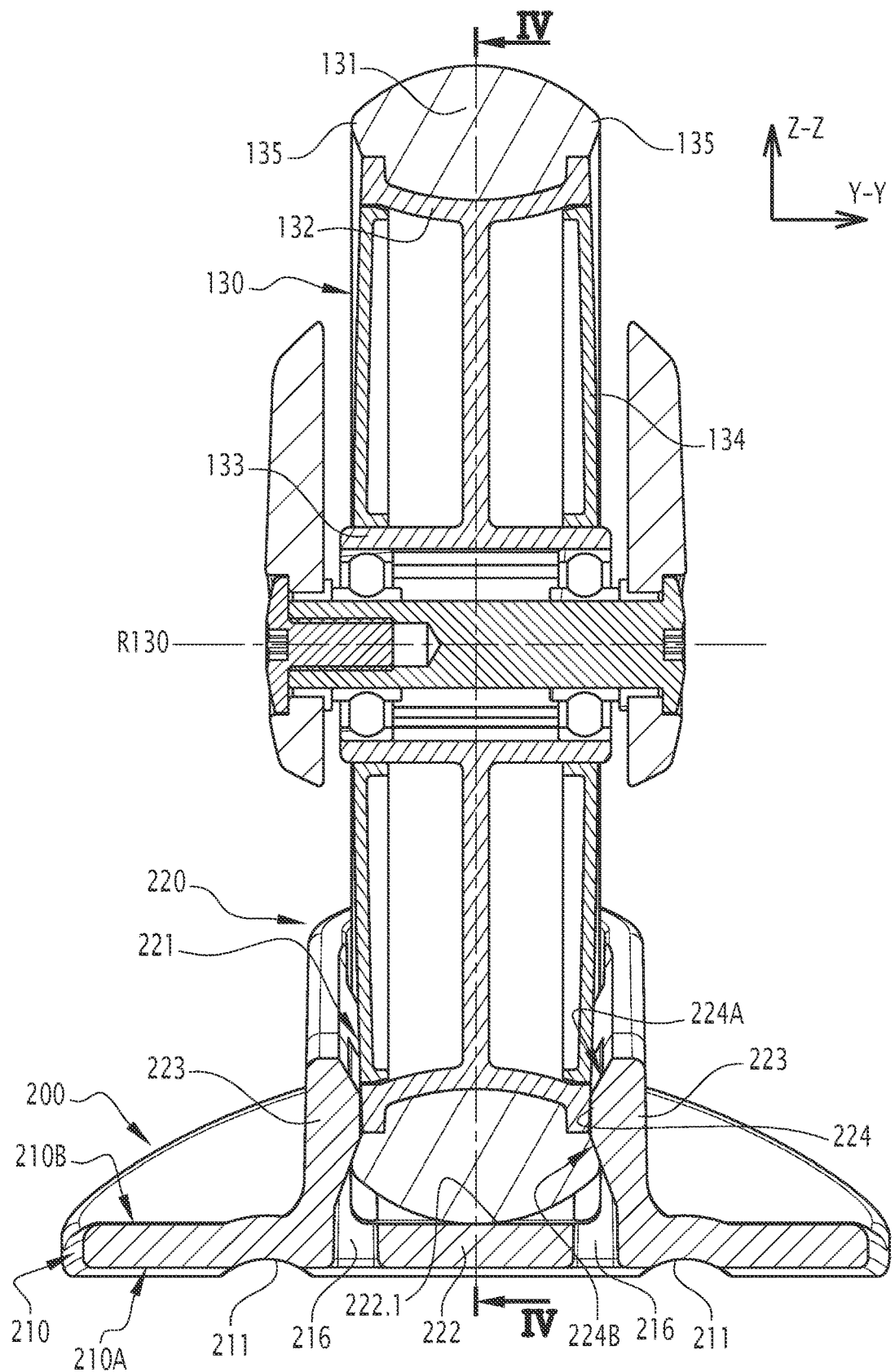
FIG. 3 is a partial cross-section according to the plane III of FIG. 2.
Figure 4:
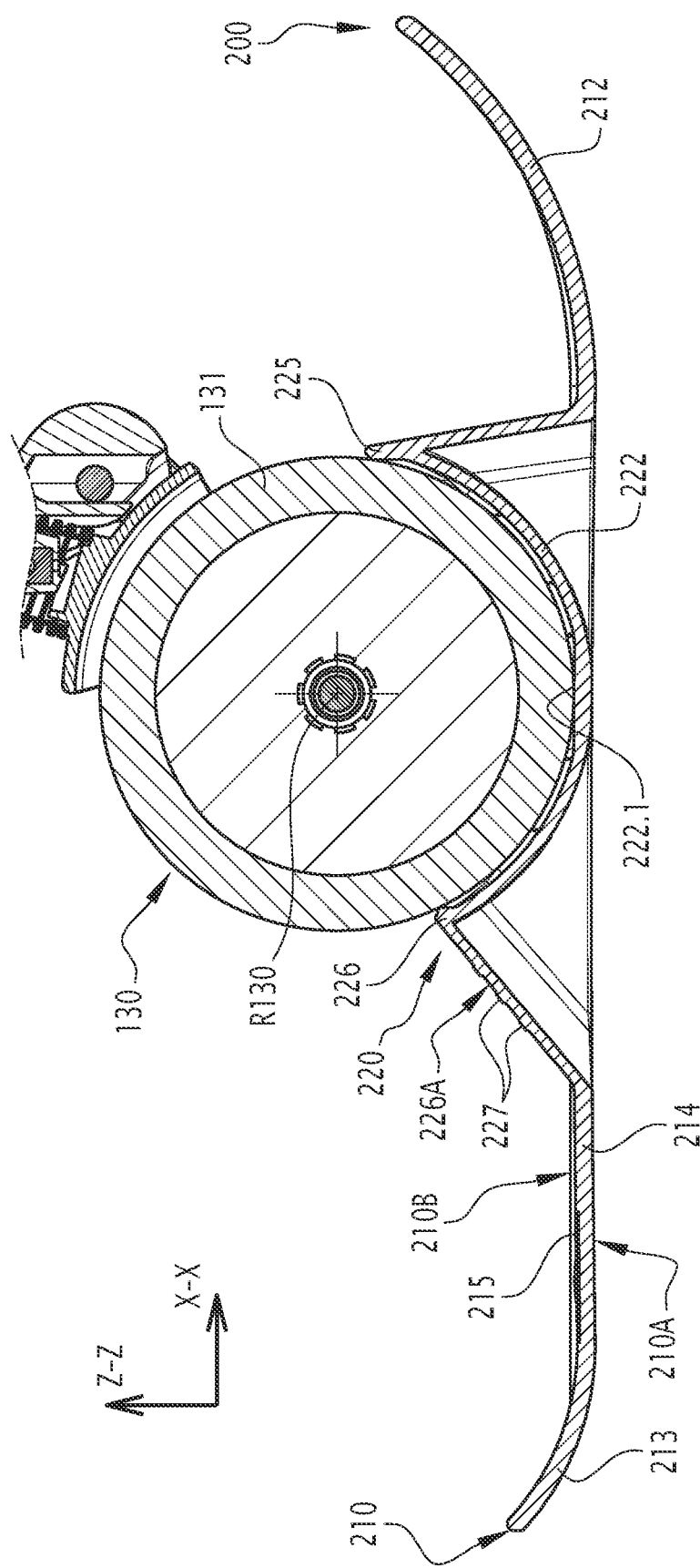
FIG. 4 is a cross-section according to line IV-IV of FIG. 3.

As can be seen from FIGS. 3 and 4, each of the front wheels 130 defines an axis of rotation R130 about which the front wheel turns on itself to roll on the ground when the latter is sufficiently hard. In operation, the respective axes of rotation R130 of the front wheels 130 extend substantially parallel to the ground. Each of the front wheels 130 is mounted on a front part of the chassis 110, advantageously being connected to this front part of the chassis so as to be freely pivotable about a pivot axis which extends radially or orthoradially to the axis of rotation R130 of the front wheel, so that the latter can, independently of its rolling about its axis of rotation, pivot about the pivot axis and thus modify the orientation of the wheel relative to the chassis 110 and therefore the direction of progression for the chassis 110 with respect to the ground. Each of the front wheels 130 can thus be described as a "pivoting wheel", sometimes referred to as an "idler wheel". In practice, the specifics of mounting the front wheels 130 on the chassis 110 are not limiting to the invention.

In all cases, each of the front wheels 130 includes a tire 131, otherwise known as a "tread", which forms an outer peripheral trim of the front wheel, being centered on the axis of rotation R130, and which, when the front wheel 130 rolls on a hard surface, is in direct contact with the ground. As can be seen in FIGS. 2 to 4, the tire 131 on each front wheel 130 is supported by a rim 132 of the wheel. This rim 132 is centered on the axis of rotation R130 and, in the example shown here, is attached to a hub 133 of the front wheel, centered on the axis of rotation R130. Also, in the example shown here, each of the front wheels 130 has two hub caps 134 which, on each of the lateral sides of the front wheel, cover the intermediate region of the front wheel between the rim 132 and the hub 133. In practice, the specific features of each of the front wheels 130, relating to the rim 132 and the connection of the latter to the rest of the front wheel, are not limiting to the invention.

In all cases, the tire 131 of each front wheel 130 is provided, on the one hand, to present a capacity for elastic deformation by compression and, on the other hand, to extend slightly beyond the rim 132 on each of the lateral sides of the front wheel, thus forming two beads 135. As can be clearly seen in FIGS. 3 and 4, each bead 135 of the tire 131 of each front wheel 130 is not flush with the corresponding rim 132 but protrudes from this rim toward the outside of the wheel. Of course, each bead 135 extends continuously around the entire periphery of the corresponding front wheel 130 and thus presents a generally annular shape, centered on the axis of rotation R130 of the front wheel. In practice, the shape and elastic deformation capacity of the beads 135 of each tire 131 result from the tire structure.

In the embodiment shown in the figures, the tire 131 of each front wheel 130 advantageously presents a solid structure which, unlike a pneumatic structure, is not affected by variable air pressure, so that the profile of the tire 131 does not undergo significant deformation under normal conditions of use of the stroller 100. The solid structure of the tire 131 is preferably made of polyurethane foam, which is shaped, for example, by being cold expanded in a closed mold. Such a polyurethane foam has the advantages of presenting constant shore hardness throughout the tire 131, as well as its high resistance to wear, which ensures that the tire 131 retains its dimensions over time and maintains its resilience at low temperatures. Of course, as an alternative, the material constituting the solid, notably foamed, structure of the tire 131 is not limited to polyurethane foam, as other materials may be envisaged, in particular when they present performances that are similar to those of polyurethane foam.

With regard to the rear wheels 140, they each define an axis of rotation about which the corresponding wheel rotates for rolling on sufficiently hard ground and which, in use, extends substantially parallel to the ground. Each of the rear wheels 140 is mounted on a rear part of the frame 110, advantageously being connected to the rear part of the frame in a fixed manner, in other words, in a non-pivoting manner compared to the front wheels 130. In the example of the embodiment shown in the figures, the respective axes of rotation of the rear wheels 140 are aligned, so that the rear wheels 140 form a fixed rear wheel set, centered on the same axis of rotation. Particularly for reasons of structural strength, this rear wheel set advantageously includes an axle bar 141, which is shown dotted in FIG. 1 and extends coaxially between the rear wheels 140, from each of the latter.

The stroller also includes a pushing member 150, which is carried integrally by the rear part of the frame 110, in the upper region of this rear part. The pushing member 150 allows the user to apply a manual force to the frame 110, in particular to push the frame 110 forward, by rolling the frame on a sufficiently hard surface by means of the wheels 130 and 140. The pushing member 150 is realized, for example, in the form of a bar, handles, etc. The design of the pushing member 150 is not limiting of the invention.

A closer look at the two sliding accessories 200 and 300 will now be undertaken. In the example embodiment shown in the figures, these two sliding accessories are identical to each other, so that only the sliding accessory 200 will be described in detail below, it being understood that the sliding accessory 300 is described in identical terms.

The description of the sliding accessory 200 is oriented relative to an orthogonal reference frame defined by the geometric axes X-X, Y-Y and Z-Z, as shown in the figures. In practice, when the sliding accessory 200 is used to at least partially slide the stroller 100 on snow-covered ground that is horizontal, the axes X-X and Y-Y, which are perpendicular to each other, are horizontal while axis Z-Z, which is perpendicular to the axes X-X and Y-Y, is vertical.

As can be seen on FIGS. 5 and 6, the sliding accessory 200 includes a baseplate 210 having an elongated shape along the X-X axis. In other words, the baseplate 210 extends lengthwise according to the axis X-X. The baseplate 210 presents sides opposite each other along the Z-Z axis, namely a lower side, intended to face the ground, and an upper side, intended to face upwards, in other words, away from the ground.

Functionally, the baseplate 210 is similar to a ski runner. In this respect, the baseplate 210 is provided, on its lower side, with a snow sliding face 210A intended to be applied against the snow-covered ground. In addition, the baseplate 210 is likely to present various features to make it easier to slide over snow-covered ground, however not limiting of the invention. By way of example, in the embodiment shown in the figures, the sliding face 210A is advantageously grooved in order to facilitate evacuation of the film of water that forms under the baseplate 210 during sliding on snow: here, the sliding face 210A is thus provided with two grooves 211 that extend along the axis X-X over substantially the entire axial extent of the baseplate 210. Furthermore, the baseplate 210 forms at its front longitudinal end 212, a spatula which, compared with the rest of the baseplate 210, widens slightly along the Y-Y axis and rises progressively upwards to its front free end. Likewise, the baseplate 210 includes a rear longitudinal end 213 which forms a heel that rises progressively upward to its rear free end, the rise of the heel being less marked than that of the spatula.

The sliding accessory 200 also includes a shoe 220 adapted to be removably attached to a stroller wheel. The shoe 220 can thus be attached to just one stroller wheel, without interfering with any other stroller wheel. In the embodiment shown in the figures, shoe 220 is thus adapted to be attached to either of the front wheels 130, as explained in greater detail below. In FIG. 1, the shoe 220 thus allows to removably attach the sliding accessory 200 to the front left wheel 130, while the sliding accessory 300 is removably attached to the front right wheel 130.

The shoe 220 is carried by the baseplate 210, being arranged on the upper side of the baseplate 210. In the embodiment considered here, the shoe 220 rises from a face 210B, the baseplate of which is provided on its upper side, and which is generally parallel to the sliding face 210A. In addition, the shoe 220 is advantageously located in an intermediate longitudinal section 214 of the baseplate 210, between the front longitudinal section 212 and rear longitudinal section 213.

The shoe 220 defines a housing 221 intended to receive a lower portion of the wheel 130. in order that the lower portion of the wheel 130 can be inserted into the housing 221 and, in a reversible manner, to be removed from it, the housing 221 is open upward, in other words, according to the axis Z-Z and in the opposite direction to the underside of the baseplate 210. In this way, the sliding accessory 200 and the wheel 130 are movable relative to each other according to the axis Z-Z so as to pass the sliding accessory 200 reversibly between:
- an operational configuration, in which the sliding accessory 200 is attached to the wheel 130, with the lower portion of this wheel fully engaged downward in the housing 221, and
- an inoperative configuration, in which the sliding accessory 200 is disengaged from the wheel 130, with the lower portion of the wheel, which is disengaged from the housing 221, being further away, according to the Z-Z axis and upward, from the baseplate 210 than in the operational configuration.

The operational configuration is illustrated in FIGS. 1 to 4 for the sliding accessory 200. The inoperative configuration is illustrated in FIG. 2 for the sliding accessory 300.

In the example embodiment shown in the figures, the housing 221 advantageously presents a plane of symmetry P, which is parallel to the axes X-X and Z-Z and lies substantially in the middle of the baseplate 210 along the axis Y-Y. This plane of symmetry P corresponds to the sectional plane VI shown in FIG. 5.

Along the axis Z-Z, the housing 221 is closed off at the bottom, in other words, in the direction of the baseplate 210, by a bottom wall 222 of the shoe 220, which is arranged transversely to the axis Z-Z. In other words, the bottom wall 222 extends across the axis Z-Z. The bottom wall 222 is provided in such a way that:
- when the sliding attachment 200 is in its operational configuration, the bottom portion of the tire 131 of the wheel 130 is pressed against the bottom wall 222 along the axis Z-Z, and
- when the sliding attachment 200 is in the inoperative configuration, the tire 131 of the wheel 130 is distant from the bottom wall 222.

In the embodiment considered in the figures, the bottom wall 222 is formed by a portion of tube, which is centered on a geometric axis Y222 parallel to the axis Y-Y and the concave surface of which is turned upward, in other words, in the opposite direction to the underside of the baseplate 210. The concave face of this portion of tube presents a radius which is slightly greater than the diameter of the wheel 130, while being provided with at least one bulge 222.1 locally reducing the spacing between this concave face and the geometric axis Y222. When the sliding accessory 200 is in operational configuration, a radial clearance remains between the concave face of the aforementioned portion of tube and the tire 131 of the wheel 130, except at the level of the or each bulge 222.1 against which the tire is pressed along the axis Z-Z, as clearly visible in FIG. 4. The bottom wall 222 is thus designed to fit snugly around the lower portion of the wheel 130, making the shoe 220 particularly intuitive for the user to engage with the wheel 130, and facilitating the removal of any snow that might clutter the housing 221 before the shoe is secured to the wheel 130.

Also in the embodiment considered in the figures, the geometric plane defined by the sliding face 210A of the baseplate 210 tangents the convex face of the portion of tube forming the bottom wall 222, as clearly visible in FIGS. 3 and 4. In service, the bottom wall 222 thus locally rests against the snow-covered ground on which the sliding face 210A is applied. This thus enhances the compactness and robustness of the shoe 220.

Along the axis Y-Y, the housing 221 is closed off by two side walls 223 of the shoe 220, namely a left-hand side wall and a right-hand side wall. The two side walls 223 are arranged parallel to the axes X-X and Z-Z, facing each other according to the axis Y-Y and being connected to each other along the axis Y-Y, by the bottom wall 222. When the sliding accessory 200 is in operational configuration, the lower portion of the wheel 130 is interposed, along the axis Y-Y, between the side walls 223, as clearly visible in FIGS. 1 to 3.

In the embodiment considered in the figures, each of the side walls 223 extends, along the axis Z-Z, as far as the baseplate 210. Each side wall 223 thus projects from the face 210B of the baseplate 210.

Each of the two side walls 223 is provided with a relief 224 which extends in a projecting manner according to the axis Y-Y from the remainder of the corresponding side wall toward the other side wall. The two reliefs 224 of the sliding accessory 200 are jointly able to cooperate by contact with the tire 131 of the wheel 130 when the sliding accessory 200 is in the operational configuration and when this sliding accessory passes between this operational configuration and the inoperative configuration. This cooperation by contact between the reliefs 224 and the tire 131 results from a dimensional interference between the reliefs 224 and the tire 131, in particular the beads 135 of the latter.

Thus, when the sliding accessory 200 is in the operational configuration, the reliefs 224 press against the tire 131, more precisely the lower portion of the latter, against the bottom wall 222 of the housing 221 according to the axis Z-Z for the purpose of securing the sliding accessory to the wheel 130, as clearly visible in FIGS. 3 and 4. In practice, the reliefs 224 thus press respectively on the beads 135 of the tire 131, more precisely on respective lower portions of these beads 135, due to the aforementioned dimensional interference between the reliefs 224 and the beads 135. In particular, the width of the tire 131 at the level of the beads 135 when the tire 135 is at rest, in other words, not subjected to crushing stresses, is intended, on the one hand, to be less than or equal to the spacing, along the axis Y-Y, between the side walls 223 outside the reliefs 224 and, on the other hand, to be greater than the spacing, according to the axis Y-Y, between the reliefs 224.

When the sliding accessory passes between the operational and inoperative configurations, the tire 131, more precisely the lower portion of the latter, is elastically compressed by the reliefs 224. This compression of the tire 131 by the reliefs 224 takes place essentially at the level of the beads 135 of the tire 131, due to the aforementioned dimensional interference between the reliefs 224 and the beads 135. At the same time, the rim 132 does not substantially constrain the reliefs 224, in the sense that the spacing, along the axis Y-Y, between the reliefs 224 is equal to or greater than the width of the rim 132.

In an optional arrangement that facilitates the transition of the sliding accessory 200 between its operational and inoperative configurations, the relief 224 of each sidewall 223 is beveled so as to progressively compress the tire 131, in particular the beads 135 thereof, toward the other side wall when the sliding accessory 200 passes from one of its operational and inoperative configurations toward the other configuration. As can be clearly seen in FIGS. 3, 5 and 6, each relief 224 thus presents, on the one hand, an upper surface 224A, which extends from the corresponding side wall 223 inclined downward and, on the other hand, a lower surface 224B, which extends from the corresponding side wall 223 inclined upward. Thus, in a transversal cross-section to the axis Y-Y, as in FIG. 3, each relief 224 presents a "V"-shaped profile, if necessary truncated at the tip of the "V".

Another advantageous optional arrangement, which is implemented in the example of the embodiment considered here, each relief 224 presents, projected according to the axis Y-Y onto the corresponding side wall 223, an arched shape which, as is clearly visible in FIG. 6, curves downward, in other words, toward the bottom wall 222 of the housing 221. This arched shape improves contact cooperation between the reliefs 224 and the tire 131 of the wheel 130. In particular, as is clearly visible in FIG. 6, each relief 224 presents a lower profile, in particular at its lower surface 224B, which is shaped like an arc of a circle the radius of which is substantially equal to that of the tire 131, in particular the beads of the latter 135. In this way, when the sliding accessory 200 is in the operational configuration, this lower profile of each relief 224 hugs the curvature of the tire 131 of the wheel 130, in particular the curvature of the beads 135. The relief 224 further presents an upper profile, particularly at its upper surface 224A, which is also arched, but the curvature of which is less than that of the upper profile. When the sliding accessory 200 passes from the inoperative configuration to the operational configuration, this upper profile of the relief 224 facilitates the engagement of the lower portion of the wheel 130 inside the housing 221, by guiding the progressive centering of the wheel 130 with respect to the lower profile of the relief 224.

Along the axis X-X, each of the reliefs 224 does not extend continuously in the example of the embodiment considered in the figures, but instead, is constituted of several separate elements 224.1, 224.2 and 224.3 which, as can be seen in FIGS. 5 and 6, are separated from one another along the axis X-X. This segmental embodiment of the 224 reliefs presents practical benefits for the manufacture of the shoe 220. This segmental embodiment also allows the reliefs 224 and the tire 131 of the wheel 130 to interact over a large area along the axis X-X, without this cooperation being continuous along the peripheral direction of the tire 131. Localized overstressing is thus avoided, since the tire 131 is not significantly stressed by the reliefs 224 in the free spaces between the elements 224.1, 224.2 and 224.3.

Along the axis X-X, the housing 221 is advantageously closed by a front wall 225 and a rear wall 226, which face each other along the axis X-X. As can be seen in FIG. 5, each of these front walls 225 and rear walls 226 connect the side walls 223 to each other, thus reinforcing the structural strength of the shoe 220 and its housing 221. When the sliding accessory 200 is in the operational configuration, the front wall 225 forms a stop, according to the axis X-X and forward, for the lower portion of the wheel 130, as clearly visible in FIG. 4. Similarly, the rear wall 226 forms a stop, according to the axis X-X and toward the rear, for the lower portion of wheel 130. The front wall 225 and rear wall 226 thus reinforce the attachment of the wheel 130 to the shoe 220 when the sliding accessory 200 is in its operational configuration. The stops formed respectively by the front wall 225 and the rear wall 226 cooperate by contact with the lower portion of the wheel 130, more precisely the tire 131 of this lower portion, due to their dimensional interference. In this respect, as can be clearly seen in FIG. 4, the front wall 225 and rear wall 226 are spaced apart along the axis X-X at the mouth of the housing 221, by a distance less than the outer diameter of the tire 131.

In the embodiment shown in the figures, each of the front wall 225 and rear wall 226 extends along the axis Z-Z as far as the baseplate 210. The front wall 225 and rear wall 226 thus each project from the face 210B of the baseplate 210. Furthermore, in the example of the embodiment shown in the figures, the front wall 225 and rear wall 226 are raised in an inclined manner relative to the axis Z-Z. The inclination of the rear wall 226 relative to the axis Z-Z is furthermore more pronounced than that of the front wall 225, being in particular at least 30°, so that the rear wall 226 presents, on its side turned upward, in other words, facing in the opposite direction from the underside of the baseplate 210, a face 226A which presents an extension substantially according to the axis X-X and is provided with one or more protrusions 227 distributed according to the axis X-X. The significance of this or these protrusions 227 will become apparent later.

In any case, the housing 221 allows the sliding accessory 200 to be connected to and disconnected from the wheel 130 simply, efficiently, conveniently and instantaneously.

Indeed, considering for example, that the stroller 100 is first used to roll over hard ground with its front wheels 130 and rear wheels 140, and then that the stroller 100 reaches snow-covered ground on which it would be difficult to progress due to the wheels sinking into the snow, the user of the stroller 100 can instantly return the sliding accessories 200 and 300 to the stroller 100, by attaching them to the front wheels 130 respectively. To do this, the user lifts the front part of the frame 110 so as to raise the front wheels 130 a few centimeters off the ground. This maneuver of lifting the front part of the stroller 100 can be easily carried out by keeping the rear part of the stroller 100 on the ground, at the level of its rear wheels 140, and this, if necessary, while a child is still present in the receiving member 120 of the stroller. The user then places the sliding accessory 200 under the front left wheel 130, positioning the latter vertically in line with the housing 221. The user can then stop the lifting of the front part of the frame 110, by resting the left front wheel 130 in the upper part of the housing 221, in particular against the respective upper surfaces 224A of the reliefs 224. The user then applies a forceful push to the front part of the chassis 210 in the direction of the ground, in other words according to the axis Z-Z and downward: the lower portion of the tire 131 of the front left wheel 130 is directed downward, being, in particular in the area of its beads 135, elastically compressed according to the axis Y-Y by the reliefs 224, until it passes these reliefs 224 downward. Once the reliefs 224 have been cleared by the tire 131, this latter tire, and in particular its beads 135, decompress at least partially, by elastic effect, while being pressed against the bottom wall 222 along the axis Z-Z by the reliefs 224. At the same time, the tire 131 abuts the front wall 225 and rear wall 226 along the axis X-X. The lower portion of the tire 131 is thus firmly wedged in the lower part of the housing 221, which ensures the sliding accessory 200 is attached to the wheel 130. The user performs the same operations with the sliding accessory 300 to attach this latter to the front right wheel 130, FIG. 2 moreover illustrates the situation in which the sliding accessory 200 is already attached to the stroller 100, while the user lifts the front part of the frame 110 and positions the sliding accessory 300 in line with the front right wheel 130 to secure it to the sliding accessory 300.

Once the two sliding accessories 200 and 300 are attached to the stroller 100, as shown in FIG. 1, the user can move the stroller 100 forward on snow-covered ground by sliding the sliding accessories 200 and 300 on the snow at the front of the stroller. Note that the stroller 100 remains maneuverable when cornering, thanks to the ability of the front wheels 130 to pivot relative to the frame 110.

Consider now that the user wishes to disengage the sliding accessories 200 and 300 from the stroller 100 because, for example, the user has reached an area of snow-free ground, the user positions himself at the side of the stroller 100 and places the front of his feet at least on the face 210B of the baseplate 210, on either side of the shoe 220 of the sliding accessory 200, so as to hold the baseplate firmly against the ground. The inclination and protrusions 227 of the rear wall 226 advantageously serve to reinforce this hold, by enabling one foot of the user to be partially placed on the face 226A of the rear wall 226 and to be held firmly with respect to the latter by rubbing/clicking against the protrusions 227. The user then pulls the front part of the frame 110 vertically toward him, in other words, according to the axis Z-Z and upward, which correspondingly pulls the front left wheel 130 out of the housing 221, by means of the elastic compression of the tire 131, in particular its beads 135, upward over the reliefs 224. The sliding accessory 200 therefore passes to the inoperative configuration. The user acts in the same way with the sliding accessory 300 to disengage this latter from the front right-hand wheel 130.

It should be noted that what has just been described for attaching/detaching the sliding accessories 200 and 300 to/from the front wheels 130 of the stroller is, in principle, directly applicable to the rear wheels 140, provided that the latter each include a tire similar to the tire 131 on the front wheels 130. In particular, provided that four of the sliding accessories are available, it is theoretically possible to equip each of the four wheels of the 100 stroller with one of the sliding accessories. However, in practice, the joint use of sliding accessories, such as sliding accessories 200 and 300, on all wheels of the stroller may not be recommended, or even inadvisable or prohibited for safety reasons: indeed, there may be a significant potential danger on sloping snow-covered ground, particularly if the user inadvertently or clumsily lets go of the stroller. In this respect, according to an advantageous optional arrangement of the sliding accessories 200 and 300, each of the latter is provided with a corresponding warning for the user, this warning facing upward, in other words, in the opposite direction to the underside of the baseplate, so as to be visible in use by the user. Thus, in the example shown in the figures, the sliding accessory 200 is provided, on the face 210B of its baseplate 210, with a visual warning zone 215. This visual warning zone 215 includes, for example, one or more pictograms and/or text, intended to make it clear to the user that the sliding accessory is to be provided only for the front wheels 130. The form of the visual warning zone 215 is not limitative and consists, for example, of a sticker, an inlaid marking, etc.

In addition to the functional performances which have been described above for the sliding accessories 200 and 300, these latter are advantageously designed to be simple and economical to manufacture. To this end, the bottom wall 222, the two side walls 223 and the front and rear walls 225 and 226 are integral with the baseplate 210, as in the example shown in the figures. In particular, the bottom wall 222, the side walls 223 and the front and rear walls 225 and 226 are preferably molded in one piece with the baseplate 210. In other words, shoe 220 and baseplate 210 are preferably integrated with one another, in particular by molding. To facilitate demolding, the baseplate 210 is advantageously provided with through-openings 216 which, as clearly visible in FIGS. 3 and 5, connect the lower and upper sides of the base 210 to each other: these through-openings 216 are arranged inline, along the axis Z-Z, with the reliefs 224.

FIGS. 7 to 11 show the sliding accessories 1200 and 1300 as an alternative embodiment to the sliding accessories 200 and 300 described so far. The sliding accessories 1200 and 1300 are functionally similar to the sliding accessories 200 and 300, in that, like the sliding accessories 200 and 300, they allow the front of the stroller 100 to slide over snow-covered ground. However, the sliding accessories 1200 and 1300 have specific features compared with the sliding accessories 200 and 300, which are detailed below.

In the example shown in the figures, the two sliding accessories 1200 and 1300 are identical to each other, so that only the sliding accessory 1200 will be described in detail below, it being understood that the sliding accessory 1300 is described in identical terms.

The sliding accessory 1200 comprises a baseplate 1210 which is functionally or even structurally similar to the baseplate 210. In particular, the baseplate 1210 is provided, on its lower side, with a snow sliding surface 1210A and is provided, on its upper side, with a face 1210B.

The sliding accessory 1200 also includes a shoe 1220 which is functionally similar to shoe 220. In particular, the shoe 1220 defines a housing 1221, which is functionally similar to the housing 221 and is delimited by a bottom wall 1222, side walls 1223, a front wall 1125 and a rear wall 1226, which are respectively functionally similar to the walls 222, 223, 225 and 226. Like the shoe 220, the shoe 1220 is advantageously integrally molded with the base 1210.

Unlike the bottom wall 222, the bottom wall 1222 is substantially flat, being formed by the baseplate 1210, more precisely by a dedicated part of the baseplate, located in line, along the axis Z-Z, of the shoe 1220. This arrangement is advantageous for the compactness, sturdiness and manufacture, in particular molding, of the sliding accessory 1200.

The side walls 1223 are essentially identical to the side walls 223, in particular by being provided with reliefs 1224 which are similar to the reliefs 224.

In contrast to the front walls 225 and rear walls 226, the front walls 1225 and rear walls 1226 are not inclined relative to the axis Z-Z but rise parallel to this axis Z-Z from the baseplate 1210. The rear wall 1226 is therefore devoid of projections such as the protrusions 227.

Independently of the structural specifications relating to the walls 1222, 1223, 1225 and 1226 of the shoe 1220, the latter presents an optional arrangement allowing to prevent the sliding accessory 1200 from being attached to the rear wheels 140 of the stroller 100. This arrangement is furthermore compatible with the manufacture of the sliding accessories 1200 and 1300 by molding.

To this end, the shoe 1220 includes a foolproof device 1227 which, by interference along the axis Z-Z with the axle bar 141, prevents the sliding accessory 1200 from changing from the inoperative configuration to the operational configuration when the user attempts to attach the sliding accessory 1200 to either of the rear wheels 140. In the embodiment shown in the figures, this foolproof device 1227 includes two webs 1227.1 and 1227.2 which are arranged substantially parallel to the axes X-X and Z-Z, being arranged on either side of the side walls 1223. In practice, webs 1227.1 and 1227.2 extend from the face 1210B of the baseplate 1210. Each of these webs 1227.1 and 1227.2 presents an end 1227.1A, 1227.2A, which is intended, notably by its dimensions, to press according to the axis Z-Z, against the axle bar 141 when the user attempts to attach the sliding accessory 1200 to one or other of the rear wheels 140. Whatever the design of the foolproof device 1227, this latter prevents any possibility of the sliding accessories 1200 and 1300 being attached to the rear wheels 140, so that there is no risk of all the wheels 130 and 140 of the stroller 100 being fitted with a sliding accessory.

In an advantageous optional arrangement, which takes advantage of the presence of the webs 1227.1 and 1227.2 of the foolproof device 1227, the sliding accessories 1200 and 1300 can be jointly arranged head-to-tail and held together by interlocking. To achieve this, each side wall 1223 and the web 1227.1, 1227.2 the closest to this side wall form between them, along the axis Y-Y, a free space 1228.1, 1228.2, as clearly visible in FIGS. 7 and 9. Each of these free spaces 1228.1 and 1228.2 is designed, in particular by its dimensions, to accommodate one of the webs of the sliding accessory 1300 when this sliding accessory 1300, in its inoperative configuration, is attached head-to-tail to the sliding accessory 1200, also in its inoperative configuration. The sliding accessories 1200 and 1300 are then arranged as in FIG. 11. In particular, each of the free spaces 1228.1 and 1228.2 is provided with a width, in other words, a dimension along the axis Y-Y, that is, with a spacing along this axis Y-Y between the corresponding side wall 1223 and the corresponding web 1227.1, 1227.2, which is substantially equal to the thickness, along the axis Y-Y, of the webs 1227.1 and 1227.2. When the sliding accessories 1200 and 1300 are in the head-to-tail state in FIG. 11, one of the webs 1227.1 and 1227.2 is wedged in one of the free spaces of the sliding accessory 1300, which tends to stabilize the head-to-tail arrangement. In all cases, when the sliding accessories 1200 and 1300 are connected head-to-tail, they together form a compact assembly, the outer shell of which is generally parallelepiped-shaped and of compact design, particularly easy to handle. For example, the sliding accessories 1200 and 1300, mounted head-to-tail in this way, are easily manipulated together to deposit in, and then retrieve them from a rear basket of the 100 stroller.

Lastly, it is possible to envisage various arrangements and variations on the stroller 100 and the 200, 300, 1200 and 1300 sliding accessories described so far. For example:
- rather than having two front wheels, the stroller can have just one front wheel; similarly, more than two front wheels and more than two rear wheels can be provided for the stroller 100;
- rather than having a solid structure, the tire 131 can be pneumatic, that is incorporating an air chamber, pressurized;
- rather than being made in one piece with the baseplate 210 or 1210, the shoe 220 or 1220 can be, as a separate part, carried by the baseplate being attached and securely fixed to this baseplate; and/or
- for sliding accessories 200 and 300, which are devoid of a foolproof system, such as the foolproof device 227, it may be provided to mitigate the above-mentioned danger, by integrating a braking device on each of the sliding accessories provided for the rear wheels 140, this braking device being designed to be activated voluntarily by the user of the stroller 100, in particular by means of a foot control, and to act by blocking the sliding of the sliding accessory on snow-covered ground.

The invention claimed is:

1. A sliding accessory for a stroller, comprising:
   a baseplate, having an elongated shape along a first axis and presenting first and second sides which are opposite each other according to a second axis perpendicular to the first axis, the baseplate being provided, on the first side of the baseplate, with a snow sliding face which is intended to be applied against a snow-covered ground, and
   a shoe, which is carried by the baseplate, being arranged on the second side of the baseplate, and which is able to be removably attached to a wheel of the stroller,
   wherein the shoe defines a housing for receiving a lower portion of the wheel, which housing is open, according to the second axis, in the opposite direction to the first side of the baseplate and which housing is fixedly delimited by a bottom wall, which is arranged transversely to the second axis, and by two side walls which are arranged substantially parallel to the first axis and to the second axis, being arranged facing each other according to a third axis which is perpendicular to the first and second axes,
   wherein each of the two side walls is provided with a relief which projects from the remainder of the corresponding side wall toward the other side wall according to the third axis, and
   wherein said reliefs are jointly arranged to cooperate by contact with a tire of the wheel so as, by relative displacement between the sliding accessory and the wheel according to the second axis, to pass the sliding accessory reversibly between:
   an operational configuration, in which the reliefs press the tire against the bottom wall according to the second axis so as to wedge a lower portion of the tire in the lower part of the housing to attach the sliding accessory to the wheel, and
   an inoperative configuration, in which the sliding accessory is detached from the wheel, the tire being elastically compressed by the reliefs according to the third axis during the transition of the sliding accessory between the operational and inoperative configurations.

2. The sliding accessory according to claim 1, wherein the relief of each side wall is beveled so as to progressively compress the tire of the wheel toward the other side wall when the sliding accessory transitions from one of the operational and inoperative configurations to the other configuration.

3. The sliding accessory according to claim 2, wherein each relief presents, in cross-section to the third axis, a "V"-shaped profile or a truncated "V"-shaped profile at the tip of the "V".

4. The sliding accessory according to claim 1, wherein each relief presents, in projection according to the third axis on the corresponding side wall, an arched shape which is domed toward the bottom wall.

5. The sliding accessory according to claim 4, wherein each relief presents, on a side turned toward the bottom wall, a profile which matches the curvature of the tire when the sliding accessory is in the operational configuration.

6. The sliding accessory according to claim 1, wherein each relief is constituted of a plurality of elements which are separated from one another along the first axis.

7. The sliding accessory according to claim 1,
   wherein the housing is also fixedly delimited by a front wall and a rear wall, which are arranged facing one another according to the first axis and which connect each of the two side walls to one another, and
   wherein the front and rear walls are able, when the sliding accessory is in the operational configuration, to form respective abutments, according to the first axis, for the lower portion of the wheel by cooperating by contact with the tire of the lower portion of the wheel.

8. The sliding accessory according to claim 1, wherein the baseplate and the shoe are integrally formed.

9. The sliding accessory according to claim 8, wherein the baseplate is provided with through openings, which connect the first and second sides of the baseplate to one another and which are arranged inline, along the second axis, on the reliefs for the purpose of demolding the sliding accessory.

10. The sliding accessory according to claim 1, wherein the bottom wall is formed by a portion of tube, which is centered on a geometric axis parallel to the third axis and the concave surface of which is directed away from the first side of the baseplate.

11. The sliding accessory according to claim 1, wherein the bottom wall is substantially flat, being formed by the baseplate.

12. A transport assembly, comprising:
a stroller comprising at least one front wheel and two rear wheels, each front wheel having a tire which is elastically deformable by compression, and
for each front wheel, a sliding accessory, which is according to claim 1 and which, in the operational configuration, is attached to the corresponding front wheel.

13. The transport assembly according to claim 12,
wherein the tire of each front wheel is supported by a rim of the front wheel and protrudes from this rim on each of lateral sides of the front wheel, thus forming two beads,
wherein the width of the tire of each front wheel at the level of the beads while the tire is at rest is both less than or equal to a spacing, according to the third axis, between the side walls outside the reliefs and greater than a spacing, according to the third axis, between the reliefs,
and wherein the spacing, along the third axis, between the reliefs is equal to or greater than the width of the rim of each front wheel.

14. The transport assembly according to claim 12,
wherein each front wheel is mounted on a front part of a frame of the stroller, being connected to this front part of the frame so as to be freely pivotable about a pivot axis which extends radially or orthoradially to the axis of rotation of the front wheel,
and wherein, when the or each front wheel and the associated sliding accessory in the operational configuration are attached to each other, the stroller remains maneuverable in turns by pivoting the front wheel or wheels relative to the chassis.

15. The transport assembly according to claim 12,
wherein the housing is also fixedly delimited by a front wall and a rear wall, which are arranged facing one another according to the first axis and which connect each of the two side walls to one another,
wherein the front and rear walls are able, when the sliding accessory is in the operational configuration, to form respective abutments, according to the first axis, for the lower portion of the wheel by cooperating by contact with the tire of the lower portion of the wheel,
and wherein the front and rear walls are, at a mouth of the housing, distant from one another along the first axis with a spacing less than the outer diameter of the tire.

* * * * *